United States Patent Office 3,845,163
Patented Oct. 29, 1974

3,845,163
BLENDS OF POLYAMIDES AND IONIC
COPOLYMER
Lee Ellis Murch, Wilmington, Del., assignor to E. I. du Pont de Nemours and Company, Wilmington, Del.
No Drawing. Filed Jan. 24, 1966, Ser. No. 522,374
Int. Cl. C08g 41/04
U.S. Cl. 260—857 L      3 Claims

ABSTRACT OF THE DISCLOSURE

Weld-line toughness of articles molded from blends of 50 to 99 percent by weight of polyamide with 1 to 50 percent by weight of an olefin/acid copolymer, e.g., ethylene/methacrylic acid, is improved when the acid groups of olefin/acid copolymer from which the blend is made are at least at least 10 percent neutralized with metal ions.

BLENDS OF POLYAMIDES AND IONIC COPOLYMER

This invention relates to novel thermoplastic polymer blends containing polyamide as a principal component and more particularly, to such blends having improved weld-line toughness.

Belgian Pat. No. 641,952 discloses thermoplastic blends containing at least 50% by wt. of polyamide and as the remainder, an acid-containing olefin copolymer in which the acid groups are derived from an $\alpha,\beta$-ethylenically unsaturated carboxylic acid. Polyamides and polyolefins are normally incompatible so that a blend of one with the other is generally deficient in physical properties. However, the blends disclosed in Belgian Pat. 641,952 exhibit good physical properties, indicative of a high degree of compatibility.

The blends of the present invention are intimate mixtures consisting essentially of at least 50% by wt. of polyamide and the remainder an acid-containing olefin polymer in which the acid is derived from an $\alpha,\beta$-ethylenically unsaturated carboxylic acid and in which at least 10% of the acid groups of the acid have been neutralized with metal ions. These blends provide a still further improvement over the prior art in the area polyamide/acid containing olefin copolymer blends, the improvement being higher toughness, particularly weld-line toughness, in molded articles. Weld lines are the lines or surfaces along which polymer must reunite and adhere to itself after flowing around an interference during molding.

The polyamide component of the blends of this invention is well known in the art and embrace those resins having a molecular weight of at least 2000 and commonly designated as nylons. Suitable polyamides include those described in U.S. Pat. Nos. 2,071,250, 2,071,251, 2,130,-523, 2,130,948, 2,312,966 2,241,322, and 2,512,606. The polyamide resin is generally produced by condensation of equimolar amounts of a saturated dicarboxylic acid containing from 2 to 10 carbon atoms with an alkylene diamine, in which the alkylene group contains from 2 to 10 carbon atoms. Excess diamine can be employed to provide an excess of amine end groups over carboxyl end groups in the polyamide. Examples of polyamides include polyhexamethylene adipamide (66 nylon), polyhexamethylene sebacamide (610 nylon), and the polyamide produced by self-condensation of caprolactam, i.e., polycaprolactam. It is also possible to use in this invention polyamides prepared by the copolymerization of two of the above polymers or terpolymerization of the above polymers or their components. As great as 99% by wt. of the blend can be composed of polyamide; however, preferred blends contain from 50 to 90%, and more narrowly 60–85%, by wt. of polyamide.

The at least partially neutralized acid-containing olefin copolymer component forming the remainder of the blend for each range of polyamide content can be prepared before blending with the polyamide component or can be prepared *in situ* by intimately contacting a blend such as that of the Belgian patent blends with neutralizing basic metal compounds. The starting acid-containing olefin copolymer in either case is preferably prepared according to the polymerization procedure disclosed in British Pat. No. 963,380. The at least partially neutralized acid-containing olefin copolymer component useful in this invention is described in Canadian Pat. Nos. 674,595 and 713,-631 both to Rees. Briefly, the prepared copolymer is a normally solid ionic copolymer of units derived from $\alpha$-olefin having the formula $RCH=CH_2$ wherein R is H or alkyl having from 1 to 8 carbon atoms and from 0.2 to 25 mole percent of units derived from an $\alpha,\beta$-ethylenically unsaturated mono- or dicarboxylic acid, at least 10% of the acid groups of said units being neutralized by metal ions having a valence of from 1 to 3, inclusive. "Derived" means that the polymer units are obtained by copolymerization of the monomers named. The ionic copolymer acts in the solid state as if it were cross-linked and in the molten state as if it were linear. "Neutralized" and variations of this word mean reacting the metal ion with the acid groups of the copolymer to obtain the ionic copolymer. The acid units are preferably, but not necessarily, randomly distributed in the copolymer chain to give a random copolymer as opposed to a block copolymer; the copolymers used in the Examples herein are random copolymers. The preferred mole percent of carboxylic acid derived units is from 1 to 8 mole percent; the preferred degree of neutralization is from 20 to 100%; and the preferred metal ions are the metals of Groups I (*a* and *b*) and II (*a* and *b*) and the transition metals of the Periodic Table. Examples of olefins include ethylene, propylene, butene-1, and hexane-1. Examples of acids include acrylic, methacrylic acids, and maleic, and fumaric acids, monoalkyl esters, and anhydrides thereof. Examples of metal ions include sodium and zinc. The ionic copolymer can be prepared by intimately contacting the acid-containing olefin copolymer, by itself, or as part of the blend with the polyamide, with a basic compound containing the particular metal ion desired to obtain the amount of neutralization desired. Examples of the basic compounds are sodium hydroxide and calcium oxide used in solid or aqueous solution form.

The polyamide and olefin copolymer components of the blend can be combined into a uniform mixture by melt blending in conventional equipment such as a Banbury mill, extruder, or the like. Alternatively, the blends may be made by solution blending or by dry mixing together of the components followed by melt fabrication of the dry mixture by extrusion or injection molding. In the case of injection molding of dry mixtures, screw preplastication or other method of giving good mixing should be employed.

The blends of this invention are thermoplastic and can be made into a wide range of useful articles by conventional molding methods employed in the fabrication of thermoplastic articles, i.e., as molded parts, extruded shapes, tubing, films, sheets, laminates, and wire coating. "Molding" means forming an article by deforming the blend in the heated plastic state.

Other components can be also introduced by conventional methods into the blends such as fillers, pigments, dyes, thermal stabilizers, such as sodium hypophosphite (SHP), antioxidants, such as "Santowhite" Powder (4,4'-butylidenebis-6-t-butyl-m-cresol), U.V. screens, anti-slip agents, plasticizers, nucleating agents, and the like. Additional antioxidants include cupric salts such as copper stearate and copper acetate and other alkyl phenolics such as 2,4,6-tris(4-hydroxy - 3,5 - di - *t* - butylbenzyl)mesitylene ("Ionox" 330), and sodium phenyl phosphinate. The amounts of these additives will generally vary between 0 to 2.0% based on the weight of the polyamide.

In the following examples, parts and percents are by weight unless otherwise indicated.

EXAMPLE 1

100 lb. of 66 nylon, available as "Zytel" 101, which has an inherent viscosity of about 1.2 measured as a 0.5% weight solution in m-cresol at 25° C., was dry tumbled with 25 lb. of a copolymer of 89% by wt. of ethylene derived units and 11% by wt. of methacrylic acid derived units, the acid portion of which was 66% neutralized with zinc ions. The copolymer had a melt index of 1.0 and contained 500 p.p.m. of "Santowhite" Powder. The dry-tumbled mixture was extruded in an 83 mm. Werner-Pfleiderer twin-screw extruder at 280° C. at a rate of 300 lb./hr. The extruded strands were cut into small particles, and these particles were molded on a 4-oz. Impco molding press using a 295° C. cylinder temperature and 50° C. mold temperature. Dumbell tensile impact test specimens were molded using gating at each end of the mold to achieve a weld in the center of the test area of the dumbbell. The tensile impact strength was measured on dry specimens as well as specimens which were conditioned to 50% relative humidity. The tensile impact values are reported in Table I.

For comparison purposes, an identical blend was prepared except that no "Santowhite" Powder was present and the acid portion of the copolymer was unneutralized. The acid-containing copolymer had a melt index of 6.1. This blend was molded and tested in the same manner as in the first paragraph of this Example. The test results are reported in Table I.

Single gated dumbbell tensile impact test specimens were molded at 295° C. from the blends of each paragraph of this Example. The overall superior toughness of the blends containing the partially neutralized acid groups was indicated by the tensile impact strengths of 330 ft. lb./in.$^2$ (dry) and 680 ft. lb./in.$^2$ (50% rel. humidity) obtained for this blend as compared to 263 ft. lb./in.$^2$ (dry) and 460 ft. lb./in.$^2$ (50% rel. hum.) for the blend containing no neutralization.

EXAMPLE 2

50 lb. of 66 nylon of Example 1 and 12.5 lb. of the partially neutralized copolymer of Example 1 (containing 500 p.p.m. of "Santowhite" Powder) were dry blended and extruded on a 2″ single-screw Egan extruder at 280° C. This blend was molded and tested in an identical manner to Example 1. The tensile impact values are reported in Table I.

EXAMPLE 3

50 lb. of the 66 nylon of Example 1 and 12.5 lb. of a copolymer of 88% ethylene and 12% methacrylic acid, having a melt index of 1.0, the acid portion of which is 28% neutralized with zinc ions, were blended, extruded, molded, and tested in the same manner as Example 2, with similar high tensile impact values, which are reported in Table I.

EXAMPLE 4

Preparation, extrusion, molding, and testing the blend of this Example was identical to Example 2, with the exception that the partially neutralized copolymer consisted of 89% ethylene derived units and 11% methacrylic acid derived units, the acid portion of which was 44% neutralized with Na ions. The copolymer had a melt index of 1.0 and contained 500 p.p.m. of "Santowhite" Powder. The test results are reported in Table I.

EXAMPLE 5

25 lb. of the 66 nylon of Example 1 and 6.25 lb. of a copolymer having a melt index of 0.85 and containing 500 p.p.m. of "Santowhite" Powder and consisting of 88% ethylene derived units and 12% methacrylic acid derived units, the acid portion of which was 76% neutralized with Zn ions, were blended, extruded, molded, and tested in an identical manner to Example 2. Test results are reported in Table I.

For comparison purposes with respect to Examples 2, 3, 4, and 5, 50 lb. of the 66 nylon of Example 1 and 12.5 of a copolymer of 89% ethylene derived units and 11% methacrylic acid derived units and having a melt index of 6.1 were blended, extruded, molded, and tested in an identical manner to Example 2. The resulting tensile impact values are reported in Table I. The control blend of this Example is less tough than any of the blends of Examples 2, 3, 4, and 5 in which the acid groups of the copolymer component were partially neutralized.

EXAMPLE 6

800 lb. of the 66 nylon of Example 1 and 200 lb. of the copolymer of Example 1 (containing 500 p.p.m. of "Santowhite" Powder) neutralized 66% with Zn ions were blended and extruded in an identical manner to Example 1 except that a molding temperature of 285° C. for the double gated tensile impact bars was used. The tensile impact values are given in Table I.

For comparison purposes, a large blend of the same proportion of the same polyamide and the same copolymer but without any neutralization of the groups and "Santowhite" Powder was extruded and molded in a manner identical to Example 6. The resulting tensile impact values are given in Table I. These values are less than that of the blend containing the partially neutralized acid groups.

EXAMPLE 7

The procedure of Example 6 was repeated except that the molding temperature for the blends was 307° C. The test results are shown in Table I.

TABLE I

| Example | Double gated tensile impact | |
|---|---|---|
| | Dry, ft.-lb./in.$^2$ | 50% rel. humidity, ft.-lb./in.$^2$ |
| 1 | 40 | 158 |
| 1 (no neutralization) | 17 | 22 |
| 2 | 54 | 53 |
| 3 | 37 | 42 |
| 4 | 36 | 148 |
| 5 | 54 | 207 |
| 5 (no neutralization) | 7 | 15 |
| 6 | 34 | |
| 6 (no neutralization) | 14 | |
| 7 | 65 | |
| 7 (no neutralization) | 26 | |

EXAMPLE 8

Single gated dumbbell tensile impact test specimens were molded at 285° C. and 307° C. from the blends of each paragraph of Example 7. Test results are as follows:

TABLE II.—SINGLE GATED TENSILE IMPACT STRENGTH

| Blend | Molding temperature, ° C. | |
|---|---|---|
| | 285 | 307 |
| Partially neutralized, ft.-lb./in.$^2$ | 376 | 416 |
| No neutralization, ft.-lb./in.$^2$ | 276 | 360 |

In the foregoing Examples, the acid copolymers were prepared according to British. Pat. No. 963,380 and neutralized according to Canadian Pat. No. 674,595. As many apparently widely different embodiments of this invention may be made without departing from the spirit and scope thereof, it is to be understood that this invention is not

What is claimed is:

1. A process for improving the weld-line toughness of an article molded from a blend of 60 to 85% by weight of a polyamide and, complementally, from 15 to 40% by weight of a copolymer of units derived from an α-olefin of the formula $RCH=CH_2$ wherein R is H or alkyl having from 1 to 8 carbon atoms and from 1 to 8 mol percent of units derived from an α,β-ethylenically unsaturated carboxylic acid, comprising molding said article having a weld-line from said blend in which at least 10% of the acid groups of said acid have been neutralized with metal ions to form an ionic copolymer of said copolymer and obtaining as a result thereof said article having improved weld-line toughness.

2. A thermoplastic blend consisting essentially of an intimate mixture of from 60 to 85% by weight of a polyamide and, complementally from 15 to 40% by weight of a random ionic copolymer of units derived from an α-olefin of the formula $RCH=CH_2$ where R is H or alkyl having from 1 to 8 carbon atoms and from 1 to 8 mole percent of units derived from an α,β-ethylenically unsaturated carboxylic acid, at least 10% of the acid groups of said acid being neutralized by zinc ions.

3. A thermoplastic blend for improving the weld-line toughness of an article having a weld line and molded from said blend consisting essentially of an intimate mixture of from 60 to 85% by weight of a polyamide and, complementally, from 15 to 40% by weight of a random ionic copolymer of units derived from an α-olefin of the formula $RCH=CH_2$ wherein R is H or alkyl having from 1 to 8 carbon atoms and from 1 to 8 mole percent of units derived from an α,β-ethylenically unsaturated carboxylic acid, at least 10% of the acid groups of said acid being neutralized by metal ions.

References Cited

UNITED STATES PATENTS

| 3,264,272 | 8/1966 | Rees | 260—78.5 |

FOREIGN PATENTS

| 1,386,563 | 12/1964 | France | 260—857 |

PAUL LIEBERMAN, Primary Examiner

U.S. Cl. X.R.

260—45.7 P, 45.75 C, 45.95, 78 R, 78.5 BB 78.5 T, 88.1 PC